No. 745,912. PATENTED DEC. 1, 1903.
E. & M. SCHISSEL.
FILTER.
APPLICATION FILED NOV. 28, 1902.
NO MODEL.

WITNESSES:
A. R. Appleman
Chas. H. Davids

Edmund Schissel,
Minnie Schissel,
INVENTORS;
BY J. R. Littell
their ATTORNEY

No. 745,912. Patented December 1, 1903.

UNITED STATES PATENT OFFICE.

EDMUND SCHISSEL AND MINNIE SCHISSEL, OF BROOKLYN, NEW YORK.

FILTER.

SPECIFICATION forming part of Letters Patent No. 745,912, dated December 1, 1903.

Application filed November 28, 1902. Serial No. 133,064. (No model.)

*To all whom it may concern:*

Be it known that we, EDMUND SCHISSEL and MINNIE SCHISSEL, citizens of the United States, residing at Brooklyn, in the county of Kings and State of New York, have invented certain new and useful Improvements in Filters, of which the following is a specification.

Our invention relates to filters, and more especially to those used for purifying water and adapted to be attached to bibs or faucets. It possesses novel advantages which permit its ready attachment, as aforesaid, and its reversal, and its constructive design is such that access to its interior may be readily had for the renewal of its contents when necessary.

Figure 1:
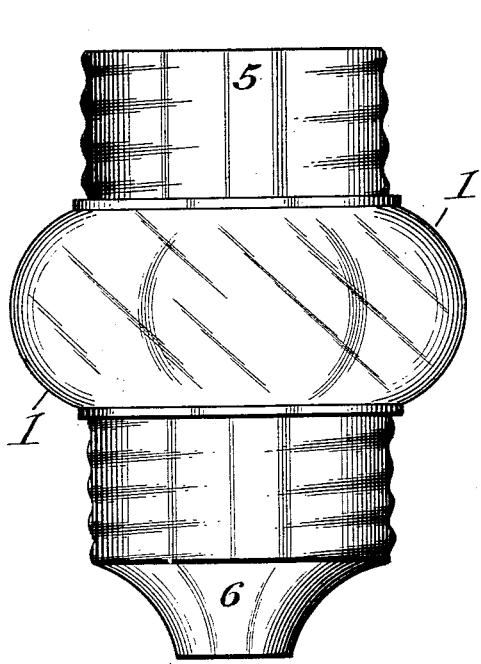
Figure 2:
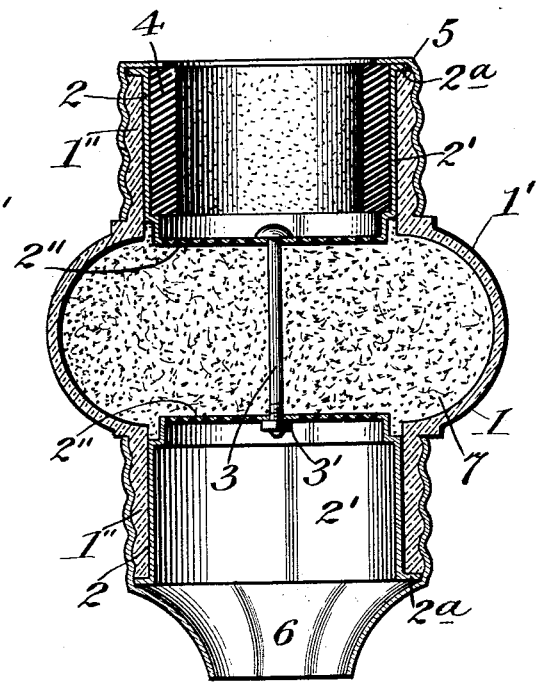

In the drawings, Figure 1 is an elevation of a complete filter, and Fig. 2 is a central vertical section thereof.

Corresponding parts in both figures are denoted by the same reference characters.

Referring to the drawings, 1 designates a filter-body, which may be made of any suitable material, but preferably of glass, and comprises a bulb 1' and necks 1" 1", the latter being alike in form, all of said parts being preferably formed integrally. The necks 1" are screw-threaded exteriorly. Strainers 2 2, alike in form, respectively comprise a cylindrical body 2', each having a perforated diaphragm 2" across one end, and a radial flange 2ª, projecting from the other end. Each diaphragm has a central perforation through which passes a binding-screw 3, which by means of a nut 3' binds the bodies longitudinally in position when the latter are inserted in the necks 1", the flanges 2ª severally engaging with the respective end faces of said necks. A compressible gasket 4, preferably of rubber, is inserted within a body 2' at one end of the filter and is retained therein by an inwardly-flanged cap 5, which is screwed upon the particular neck 1" which surrounds the gasket 4. A nozzle 6 is screwed onto the opposite neck 1".

Pulverized charcoal or any other suitable filtering substance 7 may be introduced into the bulb 1' and will be retained therein by the strainers 2, which are held in place, as aforesaid, by the screw 3 and nut 3'.

The operation and advantages of our invention will be readily understood by users thereof.

In use the filter is attached to a suitable faucet or bib by means of the compressible gasket 4, which surrounds said faucet or bib and frictionally engages therewith. Water flowing through the filter is purified by passing through the contents of the bulb 1', gross impurities being separated from the water by means of the strainers 2, which, while permitting the water to flow freely, prevent the filtering substance from being displaced. Should the filtering substance become foul by reason of long-continued use, it may be purified by reversing the positions of the gasket 4 and cap 5 to the opposite end of the filter and replacing them with the nozzle 6. The filter being then again attached to a faucet or bib, as aforesaid, water flowing through the former will wash out the impurities previously collected by the filtering substance 7.

We do not desire to be understood as limiting ourselves to the details of construction and arrangement as herein described and illustrated, as it is manifest that variations and modifications may be made in the features of construction and arrangement in the adaptation of the device to various conditions of use without departing from the spirit and scope of our invention and improvements. We therefore reserve the right to all such variation and modification as properly fall within the scope of our invention and the terms of the following claim.

Having thus described our invention, we claim and desire to secure by Letters Patent—

A filter, comprising a hollow body provided at each end with an exteriorly-threaded neck, a cup-shaped strainer fitted within each of said necks and each strainer provided with a perforated diaphragm at one end and at the other end with a radial outward flange taking over the end face of the respective neck, a binding-screw connecting said strainers together, a filtering medium in the hollow body between said diaphragms, a compressible gasket fitted within the body portion of one strainer, a cap screwing on one of the necks and provided with an inwardly-extending flange taking over said gasket and retaining the latter in place, and a nozzle screwed on the opposite neck, as set forth.

In testimony whereof we have signed our names in the presence of the subscribing witnesses.

EDMUND SCHISSEL.
MINNIE SCHISSEL.

Witnesses:
　LOUIS SCHISSEL,
　JAS. W. GASKILL.